United States Patent [19]

Hendrix et al.

[11] Patent Number: 5,412,007
[45] Date of Patent: May 2, 1995

[54] STABLE PETROLEUM RESIN-WATER EMULSION

[75] Inventors: Randall R. Hendrix, Spring; Bruce E. Wilburn, Houston; Aidan P. Cooney, Conroe, all of Tex.

[73] Assignee: Pennzoil Products Company, The Woodlands, Tex.

[21] Appl. No.: 191,505

[22] Filed: Feb. 4, 1994

[51] Int. Cl.$^6$ .................. C09K 3/22; C08L 97/02; C08L 57/02; C08K 5/05
[52] U.S. Cl. .................. 524/72; 252/88; 524/74; 524/376; 524/499; 524/570; 526/290
[58] Field of Search .............. 524/72, 74, 376, 570, 524/499; 526/290; 252/88

[56] References Cited

U.S. PATENT DOCUMENTS

| | | | |
|---|---|---|---|
| 4,001,033 | 1/1977 | Anthone et al. | 252/88 |
| 4,425,252 | 1/1984 | Cargle et al. | 252/88 |
| 4,561,905 | 12/1985 | Kittle | 252/88 |
| 4,571,116 | 2/1986 | Patil et al. | 252/88 |
| 4,737,305 | 4/1988 | Dohner | 252/88 |
| 4,801,635 | 1/1989 | Zinkan et al. | 252/88 |
| 5,192,337 | 3/1993 | Wajer et al. | 252/88 |
| 5,256,169 | 10/1993 | Roe | 44/626 |

FOREIGN PATENT DOCUMENTS 0188580  7/1989  Japan .................. 252/88

*Primary Examiner*—Peter A. Szekely
*Attorney, Agent, or Firm*—Lowe, Price, LeBlanc & Becker

[57] ABSTRACT

A stable composition for suppressing dust which comprises 0.1 to 35 parts by weight of a water-soluble ligno-sulfonate anionic surfactant, 0.1 to 35 parts by weight of one or more non-ionic surfactants, 5 to 85 parts by weight of a petroleum resin, and 1 to 99 parts by weight of water.

11 Claims, No Drawings

STABLE PETROLEUM RESIN-WATER EMULSION

TECHNICAL FIELD

This invention relates to stable petroleum resin-water emulsions for applications such as dust suppression on dirt or gravel road surfaces and the like. In particular, this invention relates to a composition for suppressing dust to provide a non-dusty surface which is stable over a long period of time and non-tacky.

BACKGROUND OF THE INVENTION

The development of stable compositions for suppressing dust on road surfaces, dirt, and the like, has been problematic. Numerous dust-suppressing compositions for road surfaces have been developed. However, very few remain stable (less than 1% separation) for long periods of time because the chosen ingredients cannot properly homogenize, thus requiring expensive reconditioning and mixing between applications when the product has been dormant for a short period of time. Further, few dust suppressant compositions effectively suppress dust and at the same time soak into the soil. Many road dust compositions containing tar and other asphalt compositions fail to absorb into the soil adequately, forming a coating on the surface of the soil. This coating easily erodes upon exposure to weather conditions. Others leave the soil surface tacky, permitting the dust suppressant to adhere to shoes and tires. The surfaces of automobiles traveling on roads which have had such compositions applied to it inevitably become flaked with a combination of soil and tar, a substance difficult to remove. Further, the dust suppressant must be reapplied frequently as it comes off the surface of the road and onto traveling vehicles. Still others require extensive curing times which extend the time during which the public is prevented from accessing the road for travel.

U.S. Pat. No. 4,801,635 to Zinkan et al. discloses a composition for coal dust suppression which comprises a mixture of water, a water-soluble anionic acrylic polymer, a non-ionic polymer, a non-ionic surfactant, and an anionic surfactant. There is no disclosure that this composition is suitable for use as a road dust suppressant and it is unlikely this composition would effectively soak into soil to prevent soil surface tackiness.

U.S. Pat. No. 4,561,905 to Kittle discloses a composition for suppressing coal dust. The composition contains an asphalt and oil emulsion mixed with non-ionic and cationic surfactants, a colloid and water. The mixture is aerated and applied in the form of a foam. After the water evaporates, a tacky film remains on the surface of the coal.

U.S. Pat. No. 4,001,033 to Anthone et al. discloses a road base stabilizer comprising a mixture of lignin sulfonate, a combination of dispersants, a fatty acid ester of polyglycerol, and polyoxyethylene ethers of alkyl-substituted phenols. The composition is mixed with pulverized soil to prepare a road base.

U.S. Pat. No. 4,571,116 to Patil et al. discloses a dust suppressant comprising a blend of asphalt, a colloid, and conventional surfactants. The Patil et al. patent discloses a variety of emulsifiers and colloids, but does not specifically disclose how to synergistically select and combine the most beneficial constituents.

SUMMARY OF THE INVENTION

It is an object of the present invention to provide a dust suppressant composition for application to soil surfaces and the like which overcomes the disadvantages of the prior art.

It is a further object of the present invention to formulate a dust suppressant composition for soil surfaces and the like which is stable and can be stored for long periods of time without requiring mixing and reconditioning, which composition may be applied evenly and uniformly to the soil surface.

A further object of the present invention is to formulate a dust suppressant composition for soil surfaces and the like which readily absorbs into the soil, which has a greater lifetime than prior art dust suppressants, which leaves soil surfaces and the like in a non-tacky and non-sticky state, which cures readily and is inexpensive.

In accordance with these objects of the invention, the present invention provides a composition for suppressing dust comprising as essential components:

- A. 0.1 to 35 parts by weight of a water-soluble anionic surfactant,
- B. 0.1 to 35 parts by weight of non-ionic surfactants,
- C. 5 to 85 parts by weight of a resin blend, and
- D. 1 to 99 parts by weight of water.

DESCRIPTION OF THE INVENTION

In accordance with the present invention, there is provided a superior dust suppressant composition which is stable and can be applied evenly and uniformly to the soil surface. The composition readily absorbs into the soil, cures quickly, and leaves the soil in a non-tacky state.

The dust suppressant composition is a petroleum resin-water composition which comprises a water-soluble anionic surfactant, one or more non-ionic surfactants, a petroleum resin, and water.

The petroleum resin-water composition of the present invention is in the form of an emulsion and is preferably prepared in concentrate form containing only a small weight percent of water. The composition is subsequently diluted with water to achieve concentrations varying from about 1:1 to 1:10 conc/water, depending on the surface to be treated.

A preferred concentrate formulation in liquid form will contain about 27 wt. % of anionic surfactant, about 3% of one or more non-ionic surfactants, about 21% water, and about 50% petroleum resin. Preferred liquid compositions are set forth in the following table:

TABLE

| Component | Weight % Range | Preferred Weight |
|---|---|---|
| Water-Soluble Anionic Surfactant | 10–45 | 15–40 |
| Non-Ionic Surfactants | 0.5–10 | 1.0–5.0 |
| Petroleum Resin | 5–85 | 10–70 |
| Water | 0–99 | 0–35 |

The composition spreads evenly and thinly and readily absorbs into the soil, leaving the soil surfaces in a non-tacky state. The treated soil surface does not stick to tires and shoes. The dust suppressant may be left dormant without the need for expensive, time consuming remixing and conditioning. The composition is extremely stable, suppresses dust for long periods of time and does not erode easily upon exposure to weather conditions as the dust is caused to stick together or agglomerate. The treated soil surfaces cure readily and are not sticky or tacky.

The surfactants useful for the purposes of this present invention include anionic surfactants and non-ionic surfactants, all of which are known in the art. The anionic surfactants have the hydrophobic portion in the anion, and may be carboxylates, sulfates, or sulfonates. The cation is alkaline earth metal, e.g. Ca, alkali metal, e.g. sodium or potassium, or ammonium or substituted ammonium.

The non-ionic surfactants are preferably polyoxyethylates of alcohols or phenols, $$R\text{—}O(CH_2CH_2O)_xH$$

where x is 1–30 and R is a $C_1$ to $C_{20}$ hydrocarbon or a alkyl substituted phenyl ring, $C_6H_4$—, but equivalent non-ionic surfactants can be used. The number of repeating units is given by x. Polyoxyethylated alcohols or phenols are preferred.

Anionic surfactants suitable for the purposes of this invention are alkaline earth metal, alkali metal or ammonium lignosulfonates. Lignosulfonates are polydispersed polymers with molecular weights ranging from several hundred to more than 100,000, with a preferred weight average molecular weight of 30,000. Lignosulfonates form numerous soluble sulfate salts. Sodium, ammonium, potassium and calcium lignosulfonates are the preferred lignosulfonates for use in this invention. Calcium lignosulfonates are most preferred. Such lignosulfonates are commercially available as powders or dissolved in water. Liquids are preferred for ease of handling. The liquids typically contain 50 or preferably 58% solids.

The lignosulfonates provide a low cost, anionic surfactant component. Further, lignosulfonates cause the formulation to soak into dirt, which fixes and immobilizes the upper surface layer of the dirt. Additionally, lignosulfonates cause the formulation to cure quicker and prevent stickiness. The use of lignosulfonates also assist in prevention of "creaming". "Creaming" is separation because of density differences between components of the petroleum resin-water emulsion.

The composition includes from 0.5 to 10 parts by weight of non-ionic surfactants, and more preferably from 0.75 to 5 parts by weight of non-ionic surfactants. Non-ionic surfactants are electrically neutral and are not ionized in aqueous solution. For polyoxyethylated alcohols, $$R\text{—}O\text{—}(CH_2\text{—}CH_2O)_xH$$

where R is a hydrocarbon or alkyl substituted phenyl group, the number of repeating groups x as defined above will determine the solubility in oil or water. Water soluble non-ionic surfactants typically have larger values of x than the oil soluble non-ionic surfactants. While a single non-ionic surfactant can be used, typically a mixture of two or more non-ionic surfactants are used. The hydrophilic portion, or water-solubizing portion, may be a repeating series of polyoxyethylates, as shown above, or a series of hydroxyl groups, although sulfur atoms, imino groups, and carboxylate and amido linkages may also act in a similar capacity.

Useful non-ionic surfactants for the purposes of this invention include polyoxyethylated alkylphenols such as Triton X-100, Tergitol NP-8, Triton N-57, polyoxyethylated or polyglyceryl esters of lauric acid such as Alkamul 400 DL, polyoxyethylene sorbitan triesters like Tween 65, and alkanol amides like Alkamide HTDE. However, the ethoxylated, or polyoxyethlated, alkyl substituted phenols like Tergitol NP-8 or alcohols like Neodol 1-7 and 1-3 are preferred. The preferred mixture is Triton N-57 and Tergitol NP-8 in a ratio from 0.1–0.5 to 1.5 to 4.5, respectively by weight.

The composition also includes from 5 to 85 parts by weight, and more preferably from 10 to 70 parts by weight of a petroleum resin. Petroleum resins are petroleum distillation residues comprised chiefly of polycyclic hydrocarbons. A particularly preferred petroleum resin is 2600 VIS RESIN sold commercially by Pennzoil Products Company. It has the following properties and acceptable range limits for the purposes of the present invention:

| Properties | Test Method ASTM-D | Specification Limits | | |
|---|---|---|---|---|
| | | Minimum | Maximum | Typical |
| Gravity °API | D-287 | | | 16–18 |
| Flash °F., COC | D-92 | 600 | 680 | 600–630 |
| Viscosity @ 210° F., SUS | D-445/2161 | 2,400 | 3,000 | 2450–2750 |
| Color, ASTM | D-1500 | | | 8+ |
| Pour Point, °F. | D-97 | | | 105 |
| Total Acid Number mg KOH/g | D-664 | | | <.03 |
| Sulfur, Wt. % | D-3120 | | .25 | .23 |
| Carbon Residue, Wt. % | D-189 | | 14.0 | 13.0 |

The composition may optionally contain from 5–45 parts by weight of a petroleum sulfonate, a known material. Petroleum sulfonates are of value in inducing homogenization of tarry substances and thus assists in stability of the composition.

The petroleum resin-water composition of the present invention is prepared in a concentrate form containing only a small weight percent of water, usually from 0 to less than 35 parts by weight, preferably about 22 wt. %. The finished concentrate has a long shelf life and remains stable over long periods of time. "Stable" means that the concentrate exhibits less than 1% separation for at least six months. The concentrate may be diluted from 1:1 to 1:10 conc/water, preferably 1:7. The diluted concentrate remains stable (less than 3% separation) for four to seven days even when the concentrate is diluted with any type of water, including hard water.

Petroleum resin-water emulsions of this invention may also contain biocides or other conventional additives in amounts of from 0.001 up to 5 wt. %.

The following examples are presented to illustrate, but not limit, the invention as obvious variations thereon will become obvious to those skilled in the art.

EXAMPLES I–VI

| Example | I | II | III | IV | V | VI |
|---|---|---|---|---|---|---|
| Norlig TSFL, wt % | 22 | 22 | — | — | — | — |
| Norlig A | — | — | 22 | 26.57 | 33.56 | 26.56 |
| Tergitol NP-8 | 3 | 2.3 | 2.3 | 2.78 | 3.5 | — |
| Triton N-57 | — | 0.25 | 0.25 | 0.3 | 0.38 | — |
| 2600 Vis Resin | 41 | 41 | 41 | 49.51 | 62.55 | 48.13 |
| Water | 34 | 33.78 | 33.78 | 22.33 | — | 22.22 |
| Neodol 1-3 | — | — | — | — | — | 0.62 |

| Example | I | II | III | IV | V | VI |
|---|---|---|---|---|---|---|
| Neodol 1-7 | — | — | — | — | — | 2.46 |

The concentrates of the above examples were stable as well as the 5.6 water to 1 part concentrate dilutions.

In the above examples, the resin is 2600 Vis Resin, sold by Pennzoil Products Company under that name. Tergitol NP-8 is the ethoxylated nonylphenol non-ionic surfactant, sold by Union Carbide under that name. Triton N-57 is an ethoxylated nonylphenol non-ionic surfactant similar to Tergitol NP-8 except that the Triton N-57 is more oil soluble. Triton N-57 is sold by Union Carbide under that name. Neodol 1-3 and Neodol 1-7 are the ethoxylated alcohols of Shell's primary $C_{11}$ alcohol, Neodol 1. Neodol 1-7 is more water soluble than Neodol 1-3. Neodol surfactants are sold by Shell. Norlig TSFL is the tradename of the commercially available ammonium lignosulfonate. Norlig A is the tradename of the commercially available calcium lignosulfonate. Norlig A is the preferred lignosulfonate. Norlig A and Norlig TSFL are sold by Lignotech, USA.

The following blending procedure was used for the Examples:

Add, in following order, to blending vessel: ammonium lignosulfonate, 2600 Resin, Triton, N-57, and NP-8. the stirrer should be turned on when the stirrer blade is covered by resin. Except for the resin, the chemicals are at room temperature. The resin is heated. The blending process can take place anywhere from 50° C. to 58° C. (121° F. to 136° F.). At the lower limit, the solution is very viscous. The water is added to resin/lignosulfonate surfactant mixture at a rate of 6.0 kilograms/min (13.22 lbs/min or 1.6 gals/min). As the water is added, the temperature will drop 22° F. The solution will go from black to brown. The viscosity will drop. At this point the water rate can be increased. The rate of stirring should be decreased. The solution should be cooled to room temperature as soon as possible.

The resulting formulations are stable for long periods. When applied to a dust covered surface, the dust is suppressed without tackiness.

The invention has been described with reference to certain preferred embodiments. However, as obvious variations thereon will become apparent to those skilled in the art, the invention is not to be considered as limited thereto.

What is claimed is:

1. A dust suppressing composition for application to road or soil surfaces comprising:
   (a) 10 to 35 parts by weight of an anionic ammonium, alkali metal or alkaline earth metal lignosulfonate surfactant,
   (b) 0.5 to 10 parts by weight of at least one non-ionic polyethoxylated alkylphenol or polyethoxylated alcohol surfactant,
   (c) 10 to 70 parts by weight of a petroleum resin, having a flash point in the range of approximately 600° F. to 680° F., a viscosity in the range of approximately 2400 to 3000 SUS at 210° F., and a pour point in the range of 80° F. to 120° F., and
   (d) 1 to 99 parts by weight of water.

2. The composition according to claim 1 wherein the non-ionic surfactant is at least one polyethoxylated alcohol.

3. The composition according to claim 1 wherein the resin is a petroleum resin comprising polycyclic hydrocarbons with a typical flash point of 600°–630° F., a viscosity of 2450–2750 sus at 210° F. and a pour point of about 105° F.

4. A dust suppressing composition for application to road or soil surfaces comprising:
   (a) 10.0 to 35 parts by weight of an anionic alkali metal, alkaline earth metal or ammonium lignosulfonate surfactant;
   (b) 0.1 to 5 parts by weight of one or more non-ionic surfactants comprising polyethoxylated alcohols or polyethoxylated alkylphenols wherein the non-ionic polyethoxylates are of the formula $R—O—(CH_2CH_2O)_xH$ wherein R is a $C_1$ to $C_{30}$ hydrocarbon, and x is 1–30,
   (c) 35 to 70 parts by weight of a petroleum resin having a flash point in the range of approximately 600° F. to 680° F., a viscosity in the range of approximately 2400 to 3000 SUS at 210° F., and a pour point in the range of 80° F. to 120° F., and
   (d) 1 to 99 parts by weight water.

5. The composition according to claim 4 wherein the lignosulfonate is calcium lignosulfonate.

6. The composition according to claim 4 wherein the non-ionic surfactant is a polyethoxylated alkylphenol.

7. An emulsion for suppressing dust on road or soil surfaces consisting essentially of:
   (a) 10.0 to 35 parts by weight of calcium lignosulfonate;
   (b) 0.1 to 5 parts by weight of a mixture of polyethoxylated alcohols;
   (c) 35 to 70 parts by weight of a petroleum resin having a specific gravity on the range of approximately 10 to 25 at 60° F. API, a flash point in the range of approximately 600° F. to 630° F., a viscosity in the range of approximately 2400 to 3000 SUS at 10° F., a pour point in the range of 80° F. to 120° F., a total acid number of less than 0.03 mg KOH/g, a sulfur content less than approximately 0.25 weight %, and a carbon residue less than approximately 14.0 weight %; and
   (d) 3 to 50 parts by weight water.

8. A concentrate for preparing a composition, which, when mixed with water, suppresses dust on road or soil surfaces, comprising the following components:
   a) 35–55 wt. % of a petroleum resin;
   b) 0.1–5 wt. % of a mixture of polyalkoxylated alcohol non-ionic surfactants;
   c) 5–25 wt. % of a lignosulfonate anionic surfactant; and
   d) 1–10 wt. % of water.

9. A method of suppressing dust on road or soil surfaces comprising applying the composition of claim 1 to a dust containing road or soil surface.

10. A method of suppressing dust on road or soil surfaces comprising applying the composition of claim 4 to a dust containing road or soil surface.

11. A method of suppressing dust on soil surfaces comprising applying the composition of claim 7 to a dust containing road or soil surface.

* * * * *

UNITED STATES PATENT AND TRADEMARK OFFICE
CERTIFICATE OF CORRECTION

PATENT NO. : 5,412,007
DATED : May 2, 1995
INVENTOR(S) : Randall R. HENDRIX et al.

It is certified that error appears in the above-indentified patent and that said Letters Patent is hereby corrected as shown below:

The table at the bottom of column 4 should read as follows:

EXAMPLES I-VI

| Example | I | II | III | IV | V | VI |
|---|---|---|---|---|---|---|
| Norlig TSFL, wt% | 22 | 22 | -- | -- | -- | -- |
| Norlig A | -- | -- | 22 | 26.57 | 33.56 | 26.56 |
| Tergitol NP-8 | 3 | 2.3 | 2.3 | 2.78 | 3.5 | -- |
| Triton N-57 | -- | 0.25 | 0.25 | 0.3 | 0.38 | -- |
| 2600 Vis Resin | 41 | 41 | 41 | 49.51 | 62.55 | 48.13 |
| Water | 34 | 34.45 | 34.45 | 20.84 | -- | 22.22 |
| Neodol I-3 | -- | -- | -- | -- | -- | 0.62 |
| Neodol I-7 | -- | -- | -- | -- | -- | 2.46 |

Signed and Sealed this

Second Day of January, 1996

Attest:

BRUCE LEHMAN

Attesting Officer     Commissioner of Patents and Trademarks